United States Patent [19]
Sieben et al.

[11] 3,808,930
[45] May 7, 1974

[54] SHEARING DEVICE IN BOLT, BALL OR ROLLER PRESSES FOR SHEARING OFF WIRE SECTIONS

[75] Inventors: Karl Heinrich Sieben; Wilhelm Pieper, both of Wuppertal, Germany

[73] Assignee: Gebr. Hilgeland, Im Rehsiepen, Wuppertal-Ronsdorf, Germany

[22] Filed: Mar. 6, 1973

[21] Appl. No.: 338,506

[30] Foreign Application Priority Data
Mar. 9, 1972  Germany.............................. 2211261

[52] U.S. Cl....................... 83/379, 83/389, 83/460, 83/453, 83/580
[51] Int. Cl............................ B26d 5/42, B26d 7/02
[58] Field of Search ............. 83/580, 389, 375, 378, 83/379, 385, 386, 387, 460, 453

[56] References Cited
UNITED STATES PATENTS
2,662,597  12/1953  Ballard et al. ......................... 83/378
3,316,570  5/1967  Am Ende............................ 83/580 X FOREIGN PATENTS OR APPLICATIONS
1,452,994  3/1969  Germany .............................. 83/580

Primary Examiner—Willie G. Abercrombie
Attorney, Agent, or Firm—Walter Becker

[57] ABSTRACT

A device for shearing wire having a tiltable shearing arm with a shearing blade having a notch to receive a wire to be sheared. A clamp lever pivoted on the shearing lever has a nose to engage a wire in the notch. Cams are provided for tilting the shearing lever and for actuating the clamp lever. A pushrod is interposed between the clamping lever and the actuating cam therefor and has two degrees of a longitudinal resilience, with the lower degree of longitudinal resilience determining the clamp pressure and the other degree of longitudinal resilience determining the force required to dislodge a wire from the notch when it is clamped therein.

9 Claims, 1 Drawing Figure

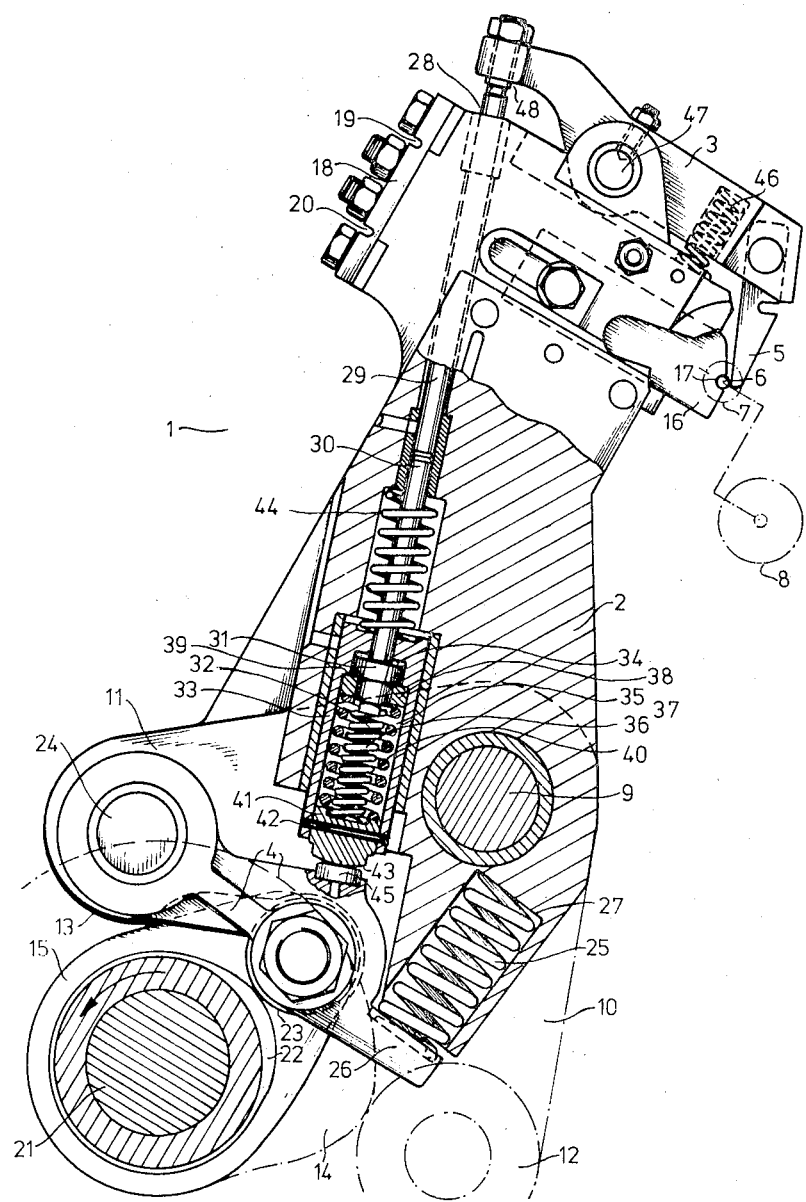

SHEARING DEVICE IN BOLT, BALL OR ROLLER PRESSES FOR SHEARING OFF WIRE SECTIONS

The present invention relates to a shearing device in bolt, ball or roller presses for shearing off wire sections by means of a stationary shearing matrix and a shearing lever adapted to pivot back and forth through the intervention of a cam disc having pivotally journalled thereon a clamping lever for stopping the wire sections.

Wire sections sheared off with heretofore known shearing devices lack a sufficiently good quality to permit producing therefrom blanks for rollers or balls in such presses which blanks without material additional costs for the subsequent fine machining step would already approximately correspond to the final state. This is due, on the one hand, to the fact that the cut or cutting surface is not perpendicular to the axis of the wire section and therefore is not defined. On the other hand, in view of the pressure exerted by the clamping lever on the wire section, damages or even deformations of the mantle surface of the wire sections may result which likewise have a negative effect on the quality of the manufactured blanks. Attempts have been made to obtain a smooth cut which is perpendicular to the axis of the wire section by increasing the counter pressure exerted by the clamping lever upon the wire section. The actual improvement obtainable in the cut in this way has, however, inherent thereto the drawback that in view of the increased pressure of the clamping lever the good surface or the mantle surface of the wire section will be damaged. This is true in particular when machining light metal wires and other non-ferrous metal wires. Furthermore an improvement in the quality of the cut can be obtained by increasing the shearing speed. With heretofore known shearing devices a certain shearing speed can, however, not be exceeded because otherwise jarring blows of the shearing lever cannot be avoided. Finally, the heretofore known shearing devices have the drawback that for their setting for different wire diameters, a relatively long time is needed and furthermore that such setting operations in view of their complexity can be carried out only by skilled personal.

It is, therefore, an object of the present invention to provide a shearing device of the above described general character which will be able to produce wire sections of satisfactory quality.

It is another object of this invention to provide a shearing device as set forth in the preceding paragraph which can be operated without difficulties by unskilled personal in a minimum of time with a minimum of steps.

It is still another object of this invention to provide a shearing device as set forth in the preceding paragraphs, which will be able to treat the wire sections in such a way that their good quality will be maintained without damage even when machining light metal wires or other non-ferrous metallic wires.

These and other objects and advantages of the invention will appear more clearly from the following specification in connection with the accompanying drawing illustrating a shearing device according to the invention, partly in section and partly in view.

The shearing device according to the invention is characterized primarily in that the clamping lever is drivingly connected to a control lever which is pivotally mounted on the shearing lever and which by means of a roller journalled on the control lever is controlled by a cam disc which is driven synchronously with the cam disc for the shearing lever. The shearing device is furthermore characterized in that in the driving train between control lever and clamping lever there are provided devices which are adapted in conformity with the control of the control lever to exert a certain clamping pressure upon the wire section through the intervention of the clamping lever and that there are also provided devices for effecting a counter holding force, which amounts to a multiple of the clamping force, in the shearing position of the shearing lever at least to avoid the escape of the wire section during the shearing process and to lift off the clamping lever from the wire section.

The above mentioned devices are, according to a preferred embodiment of the invention, characterized in that a pressure bar longitudinally displaceably mounted on or in the shearing lever has its one end drivingly connected to the clamping lever and has its other end drivingly connected to a spring system with two pressure springs of different spring characteristic and/or preload which spring system is longitudinally mounted on or in the shearing lever. This spring system rests against an abutment on the control lever in view of the thrust exerted by the pressure spring which is mounted on or in the shearing lever. The two springs of the spring system become successively effective in conformity with the relative displacement between pressure bar and spring system. According to another feature of the invention which makes possible an easy setting of the shearing device, the clamping lever rests under the influence of a pressure spring against the pressure bar through the intervention of an adjustable abutment.

In order to assure that the forces exerted by the control lever or by the roller of the control lever on the shearing lever will as far as possible not exert upon the shearing lever any torques, the pivot points of the shearing lever, of the roller, of the control lever and of the cam discs are located at least approximately along a straight line, especially at the time of the maximum load exerted by the clamping lever (shearing position). In order to be able to operate the shearing lever at maximum speeds which improves the cut and in order to avoid jarring blows, according to a further feature of the invention, a double cam disc is provided for controlling the shearing lever.

To make sure that the roller of the control lever remains in contact with the associated cam disc, according to a further feature of the invention, a pressure spring is provided between the control lever and the shearing lever. Another possibility of maintaining a good contact between the control lever and the cam disc pertaining thereto consists in providing a double cam disc for controlling the control lever.

Referring now to the drawing in detail, the shearing device 1 consists primarily of a shearing lever 2, a clamping lever 3 and a control lever 4. Adjustably connected to the clamping lever 3 is a clamping finger 5 the free end of which, in conformity with the drawing, engages a wire section or wire end 6 to be sheared off. The shearing matrix 7 of the press (not illustrated) is indicated only by dash lines. The press matrix 8 or the first press matrix of the press is illustrated in a similar manner.

The shearing lever 2 is mounted on a rotary shaft 9. On that end of the shearing lever 2 which faces away from the clamping lever 3 there are provided rollers 12, 13 which are mounted on arms 10, 11 of the shearing lever 2. The roller 12 moves on a cam disc 14 whereas the roller 13 moves on a cam disc 15. The cam discs 14 and 15 are along their cam surface so designed and dimensioned that the shearing lever 2 through arms 10 and 11 rigidly connected to the shearing lever 2 is positively connected to the cam discs. Moreover, the cam path of the cam discs 14 and 15 is so designed that the imaginary center point of the approximately semicircular shearing edge of the shearing surface 17, which forms half of a cylinder mantle, moves back and forth between the center points of the shearing matrix 7 and the press matrix 8 and remains in the respective end position for a predetermined time, the shearing edge being adapted to the diameter of the wire to be sheared off.

The shearing plate 16 is so connected to the shearing lever 2 that it can be exchanged for another shearing plate and is adjustable on a circular arc about the imaginary center point and toward this center point. This will permit a simple adjustment of the shearing plate 16 into the respective position which is most favorable for a proper functioning of the shearing device. The shearing plate 16 rests through the intervention of the above described elements for the adjustment against a pressure member 18 which is connected to the shearing lever 2 on the oppositely located side. This pressure member 18 serves as overload safety device and to this end is provided with notches 19 and 20.

The cams 14 and 15 are connected to a shaft 21 which rotates in the direction indicated by the arrow A, the shaft being journalled in the press frame. Furthermore, shaft 21 has connected thereto a cam disc 22 on which a roller 23 is movable which is mounted on the control lever 4. The control lever 4 is journalled on an arm 11 on a pivot shaft 24 which at the same time also serves for journalling the roller 13. The roller 23 is primarily by means of a pressure spring 25 maintained in contact with the cam disc 22. The pressure spring 25 rests on the one hand against an extension 26 of the control lever 4 and on the other hand rests against a bearing 27 of the shearing lever 2. Instead of this arrangement, also an arrangement is possible, especially at high shearing speeds, according to which the control lever 4 is, similar to the shearing lever 2, positively controlled by a double cam disc.

Arranged in the shearing lever 2 is a pressure bar 28 which is composed of the sections 29 and 30. The section 30 is on that side thereof which faces away from the section 29 provided with a flange-like collar 31 located within a spring system 32. The spring system 32 which is longitudinally displaceable in the shearing lever 2 comprises a sleeve 33 with axial bores 34 and 35. The collar 31 of part 30 of the pressure bar 28 is longitudinally displaceable within certain limits and is journalled in the bore 34. An extension 37 of the section 30 of the bar 28 is engaged by a pressure spring 36 which in its turn rests against a bearing 41 which is fixedly connected to the sleeve 30. Adjacent to the bore 34 in the direction toward the control lever 4 there is provided a bore 35 in which there is axially displaceably arranged a ring 38 which extends around the extension 37. Ring 38, due to the thrust of a pressure spring 40, rests against the collar 39. The pressure spring 40, similar to the pressure spring 36, rests against the bearing 41 which is fixedly connected to the sleeve 33. The connection of the bearing 41 with the sleeve 33 is effected by means of a pin 42 extending through the bearing 41 and the sleeve 33. The convexly shaped outer part 43 of the bearing 41 rests against an abutment 45 in view of a pressure spring 44 which is mounted in the shearing lever 2. The abutment 45 is connected to the control lever 4 on that side of the control lever 4 which is located opposite the cam disc 22.

With the specific illustrated embodiment of the shearing device according to the invention, a further pressure spring 46 is necessary which on the one hand rests against the shearing lever 2 and on the other hand rests against the clamping lever 3 and the clamping finger 5 to assure a safe venting or lifting off of the clamping finger 5 when the wire is being pulled in.

The operation of the shearing device according to the invention is as follows. Starting from the position of the shearing lever 2 illustrated in the drawing, the pulling-in of the wire by the control lever 4, the spring system 32, the pressure bar 28 and the clamping lever 3 with the clamping finger 5 being completed, first only the relatively low clamping pressure of the pressure spring 36 is exerted upon the wire section to be sheared off. If the wire section during the shearing operation should even only slightly escape, for obtaining a smooth and perpendicular cut, immediately the considerably higher, for instance six times higher, counter holding force will become effective which is generated by the pressure spring 40. This occurs because in view of the effected adjustment or setting of the clamping lever, even if the escape movement of the clamping lever in the shearing position of the shearing lever is only very minor, the collar 31 of the section 30 will immediately engage the ring 38 which latter is under the load of the pressure spring 40. The sleeve 33 of the spring system 32 is during the shearing operation for all practical purposes not displaced relative to the shearing lever 2.

After effected shearing off of the wire section and, as the case may be, under the additional influence of the thrust of pressure spring 40, the wire section is transported in front of the press matrix 8. After the wire section 6 by non-illustrated tools of the press has been moved into the press matrix 8, the control lever 4 is by means of cam disc 22 so controlled that the pressure bar 28 can move away from the abutment 48 which is located on that side of clamping lever 3 which is arranged opposite to the clamping finger 5 so that the clamping finger 5 under the effect of the pressure spring 46 will be lifted off from the shearing plate 16 to such an extent to permit the pulling-in of a new wire section without damaging the same. While the pressure spring 44 is intended to maintain the spring system 32 in contact with the abutment 45 of the control lever 4, the pressure spring 46 is intended to hold the adjustable abutment 48 in contact with the respective end of part 29 of pressure bar 28.

The setting of the shearing device according to the invention is extremely simple and can be effected in a minimum of time. To this end, the machine setter merely has to turn the flywheel of the machine first to such an extent that the shearing plate 16 engages the wire which in the meantime has been pulled in. By turning the abutment 48 which is formed by a setting screw, the clamping finger 5 is brought into engagement with the wire section 6. The abutment 48 is so set that the strong counter pressure of the pressure spring 40 will just be felt. In this way, at the same time also the setting of the considerably lower clamping force is effected in conformity with the pressure spring 36. For controlling this adjustment, the shearing lever 2 may by turning the flywheel further be moved to such an extent that the wire section 6 will be located in front of the opening of the press matrix 8. In this position of the shearing lever 2, the clamping finger 5 must be able by a slight manual pressure upon the abutment 48 or the respective end of the clamping lever to be lifted off by approximately 0.2mm, i. e. lifted off the wire section 6. In certain instances, it may be advantageous, during the shearing operation fundamentally, in other words without necessitating a certain escape movement of the wire section, to carry out the setting in such a way that the counter holding force exerted by the spring 40 is effective, and that only during the transport of the wire section 6 to the matrix 8 this counter force is made ineffective.

To make sure that in the various positions of the shearing lever 2 no material torques will be exerted by the control lever 4 upon the shearing lever 2, the center points of shaft 21 and the cam discs connected thereto as well as the center points of the roller 23 and of the shaft 9 must be located approximately along a straight line.

The shearing device according to the present invention not only permits a careful treatment of the wire sections to be processed further but also creates the conditions necessary for a clean, well defined cut with a shearing output which considerably exceeds that of heretofore known such devices.

It is, of course, to be understood that the present invention is, by no means, limited to the specific showing in the drawing but also comprises any modifications within the scope of the appended claims.

What is claimed is:

1. In a shearing device for shearing wire; a shearing lever and a shaft tiltably supporting the shearing lever, first rotary cam means adjacent one end of the shearing lever operable for tilting the shearing lever between shearing position and delivery position, a shearing blade on the shearing lever near the other end thereof and having a notch to receive the wire to be sheared, a clamp lever pivoted on the said other end of said shearing lever and having a nose portion adapted clampingly to engage a wire in said notch, a control lever pivoted to said shearing lever near said one end thereof, pushrod means extending from said control lever to said clamp lever for actuation of the clamp lever in response to tilting of said control lever, and second rotary cam means adjacent said control lever for the actuation thereof, said pushrod means comprising first resilient means which determines the clamping force of the nose on a wire in said notch and second resilient means which develops a substantially greater force on the nose in clamping direction in the event a wire in said notch moves outwardly in said notch.

2. A shearing device according to claim 1 in which said first and second resilient means comprise respective first and second springs, said first and second springs being operatively interposed between the end of said pushrod engaging said control lever and the end of said pushrod engaging said clamp lever and yielding when the nose engages a wire in said notch to control the clamping pressure exerted on the wire, said second spring offering substantially greater resistance to yielding than said first spring but yielding when the nose is moved by a wire moving outwardly in said notch thereby substantially to increase the force acting on the nose in clamping direction.

3. A shearing device according to claim 1 in which said pushrod comprises a rod portion having one end engaging said clamp lever and a sleeve having one end engaging said control lever, the other end of said rod reciprocably engaging the other end of said sleeve, a collar mounted in a predetermined position in the said other end of said sleeve and slidable toward the said one end of the sleeve, said first resilient means comprising a first spring bearing between said one end of said sleeve and said other end of said rod portion, said second resilient means comprising a second spring stronger than said first spring and bearing between said one end of said sleeve and said collar, a shoulder on said rod portion engageable with said collar when said pushrod has actuated said clamp lever into clamping position, and abutment means in said sleeve to engage said collar on the side facing away from said one end of the sleeve to abut said collar in said predetermined position.

4. A shearing device according to claim 1 which includes spring means biasing said clamp lever in unclamping direction.

5. A shearing device according to claim 1 which includes adjustable abutment means interposed between said pushrod means and said clamp lever.

6. A shearing device according to claim 1 in which said control lever has a roller engaging said second cam means, the axis of the shaft tiltably supporting said shearing lever, the axis of said roller and the axis of said second cam means being substantially coplanar.

7. A shearing device according to claim 1 in which said first cam means comprises first and second cam discs and respective rollers on said shearing lever engaging said discs.

8. A shearing device according to claim 1 which includes a spring acting between said shearing lever and said control lever to bear the control lever toward said second cam means.

9. A shearing device according to claim 1 in which said second cam means comprises first and second cam discs.

* * * * *